United States Patent [19]

Baret

[11] 4,275,764
[45] Jun. 30, 1981

[54] COMBINATION PRESSURE REGULATOR AND MANUAL ON-OFF VALVE

[75] Inventor: Denis Baret, Saint Lager, France

[73] Assignee: Berthoud, S.A., Belleville sur Saone, France

[21] Appl. No.: 48,128

[22] Filed: Jun. 13, 1979

[51] Int. Cl.³ .................... F16K 31/145; F16K 31/44
[52] U.S. Cl. .......................... 137/614.19; 137/505.41; 137/454.6; 251/246
[58] Field of Search ............. 137/613, 614.19, 505.41, 137/454.5, 454.6; 251/246, 236, 242, 244

[56] References Cited

U.S. PATENT DOCUMENTS

| | | | |
|---|---|---|---|
| 2,147,850 | 2/1939 | MacLean | 137/613 |
| 2,302,306 | 11/1942 | Faast | 251/246 |
| 2,809,800 | 10/1957 | Ahl | 251/236 |
| 2,821,206 | 1/1958 | Holmes | 137/614.19 |
| 3,164,172 | 1/1965 | Lee | 137/880 |
| 3,308,847 | 3/1967 | Umann | 137/613 |
| 3,575,205 | 4/1971 | Caparone et al. | 137/505.41 |
| 3,730,773 | 5/1973 | Graber | 137/505.41 |

FOREIGN PATENT DOCUMENTS 470675   4/1952   Italy ........................... 251/244

Primary Examiner—Martin P. Schwadron
Assistant Examiner—A. Michael Chambers
Attorney, Agent, or Firm—Dowell & Dowell

[57] ABSTRACT

A combination pressure regulator and manual on-off valve for liquid spraying apparatus. A tubular member 31 has a lower end 31b which forms a valve seat which cooperates with a first valve member 32 actuated by a lever 35. The latter has a lug 35b which acts as a resilient attaching blade. The intermediate member further comprises a portion 31e, the periphery of which is in contact with the wall of a bore 23. A diaphragm 37 is clamped against portion 31e by means of a tubular screw 39. The diaphragm is solid with a second valve member 38.

6 Claims, 3 Drawing Figures

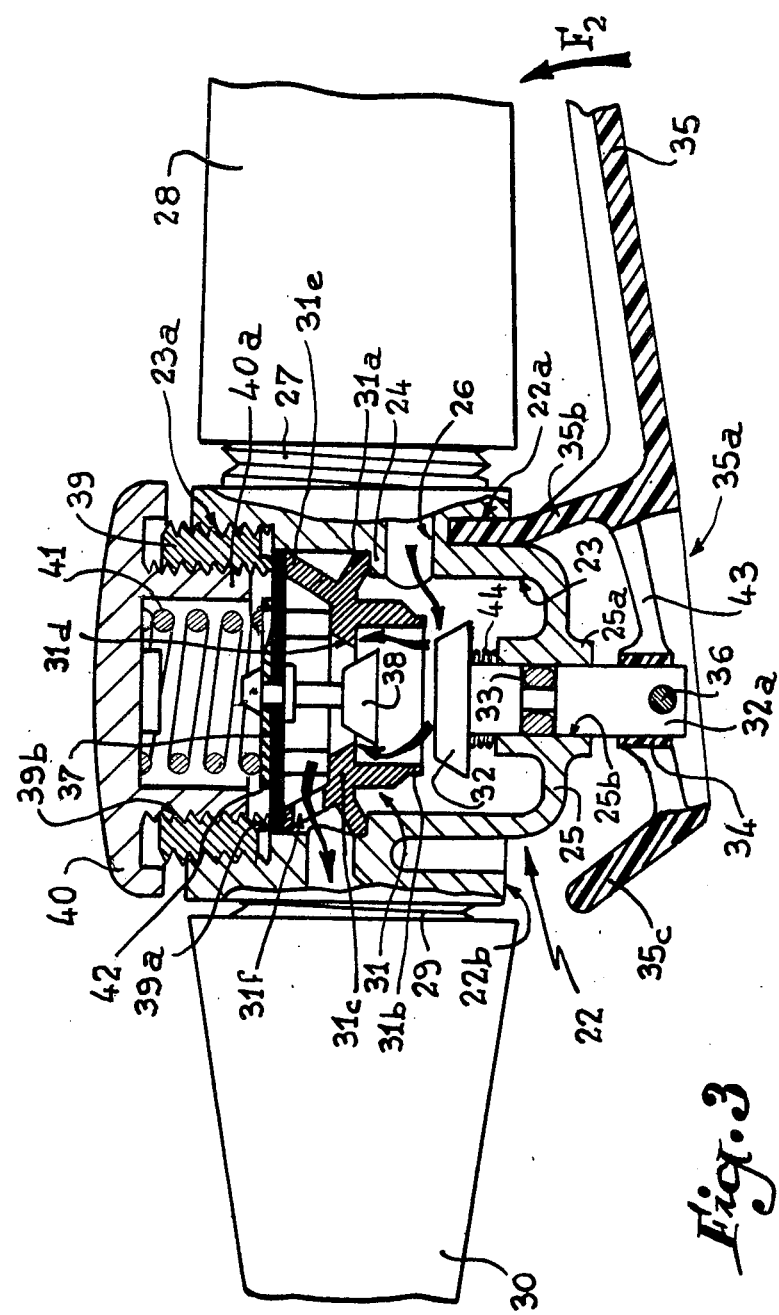

1

COMBINATION PRESSURE REGULATOR AND MANUAL ON-OFF VALVE

FIELD OF INVENTION

The present invention relates to a combined valve unit forming at the same time an on-off control valve and a pressure regulator for liquid spraying apparatus.

DESCRIPTION OF PRIOR ART

In portable liquid spraying apparatus used in agriculture for the treatment of plants and trees, the operator has to start and stop the spraying operation as often as may be desired and furthermore he should be able to control at will the spraying pressure. The apparatus should therefore be equipped with an on-off valve and with an adjustable pressure regulator. This of course complicates the manufacture of such apparatus and increases their cost. Moreover it is not always convenient for the operator to have to actuate two different devices.

SUMMARY OF INVENTION

It is the object of the present invention to provide a combined valve unit of simple construction, of reduced manufacturing cost, which permits of effecting both controls with the sale hand.

In accordance with the present invention in a combined valve unit having an inner space wherein a pressure regulator and an on-off valve are disposed, the said space is divided by a transverse partition into a first and a second chamber, the first one containing the pressure regulator while the on-off valve is disposed in the second one, the said on-off valve having an axially movable stem which projects outwardly of the boby of the valve unit to receive the action of external actuating means.

BRIEF DESCRIPTION OF DRAWINGS

The invention will be best understood from the description which follows and from the accompanying drawings, which description and drawings, given particularly by way of indication, will also make apparent other advantages and objectives and also the important characteristics of the invention, of which the main ones are also defines in the accompanying claims.

FIG. 3 shows the valve of FIG. 2 at the open position.

DESCRIPTION OF PREFERRED EMBODIMENT

Figure 1:
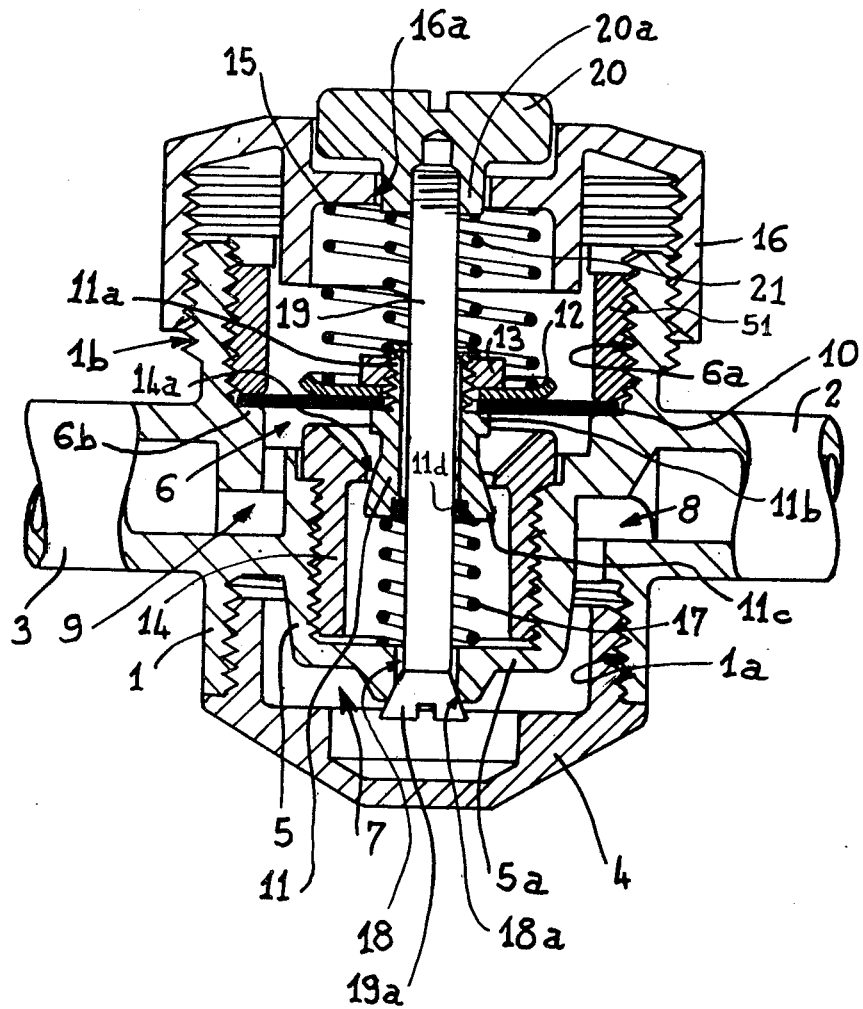
FIG. 1 is a longitudinal section of a valve unit according to the invention.

The valve unit illustrated in FIG. 1 comprises a hollow body 1 having a lateral inlet 2 and a lateral outlet 3. The lower end of body 1 is closed by a plug 4 which is screwed into a screw-threaded bore 1a. Body 1 further comprises a transverse partition 5, having a central U-shaped depression and which divides the inner space of the said body into two chambers 6, 7, the lower one 7 being closed by plug 4. Inlet 2 is connected with this lower chamber 7 by a canal 8, while another canal 9 connects the upper chamber 6 with outlet 3.

The upper chamber 6 includes an upwardly opening screw-threaded bore 6a which defines at its lower end a shoulder 6b against which a resilient diaphragm 10 is pressed by a ring 51 or annular screw screwed into bore 6a. The center of diaphragm 10 is perforated for passage of the screw-threaded stem 11a of a first valve member 11 and it is clamped against a shoulder 11b of the said stem 11a by a cup-shaped washer 12 and a nut 13. Valve member 11 has a frusto-conical head 11c which is adapted to cooperate with a seat 14a formed in the transverse wall of a tubular socket 14 screwed into the central depression of partition 5.

The cup-shaped washer 12 forms a bearing surface for the lower end of a compression spring 15 the upper end of which abuts against a cap-shaped hand-wheel or button 16 screwed on the outer periphery 1b of the upper portion of body 1.

Another compression spring 17 is disposed between the head 11c of valve member 11 and the horizontal bottom 5a of the central depression of partition 5. It will be noted that this bottom 5a has an axial perforation 18 which opens downwardly in the form of a frusto-conical seat 18a.

Valve member 11 has an axial bore in which is disposed a rod 19 the lower end of which is formed with a conical head 19a adapted to cooperate with seat 18a. The upper end of rod 19 is screw-threaded and it receives an actuating knob 20 having a downwardly protruding boss 20a which passes freely through a perforation 16a provided in the hand-wheel 16. A compression spring 21 is disposed around rod 19 between the upper end of the stem 11a of valve member 11 and boss 20a to apply head 19a against seat 18a. Head 19a and rod 19 thus form a second or inner spring-pressed valve member, head 11c and stem 11b being the first or outer one.

The space situated above diaphragm 10 communicates with the outer atmosphere through the clearance provided around knob 20 within button 16 and it is separated from the space below the said diaphragm by an annular seal 11d disposed in the perforation of valve member 11, around rod 19.

In operation, as long as button 20 is not actuated the valve unit remains closed, no liquid flowing from inlet 2 towards outlet 3 since the second valve member 19a—19 is applied against its seat 18a by the reaction of spring 21 on knob 20. If now the operator depresses knob 20, the inner valve member 19, 19a opens and the liquid may reach the space defined by socket 14 and the bottom of the central depression of partition 5. Under normal conditions the first valve member 11 is then open, the downwardly directed action of springs 15 and 21 prevailing over that of spring 17 which tends on the contrary to raise valve member 11. The liquid may therefore flow towards outlet 3 from which it reaches the spraying nozzle or nozzles. But as soon as pressure rises within outlet 3, it acts on diaphragm 10 which tends to raise. Valve member 11 is therefore progressively raised until a state of equilibrium is reached. The valve unit thus operates as a pressure regulator, the pressure of the liquid at the nozzles being adjustable by button 16 which increases or decreases the reaction of spring 15 and therefore the downwardly directed load imparted to diaphragm 10.

With the valve unit according to the invention the operator may thus control at will and with the same hand the passage of the liquid towards the nozzle or nozzles and the spraying pressure itself.

It is to be noted that when knob 20 is depressed, spring 21 is compressed, which increases its action on diaphragm 10. In order to avoid this, the said spring may advantageously be disposed between head 19a and the bottom of plug 4 where it has no influence whatever on the diaphragm. With such an arrangement the conical head 19a of the inner or second valve member may be replaced by a mere ball which rod 19 pushes downwardly against the action of the spring.

Figure 2:
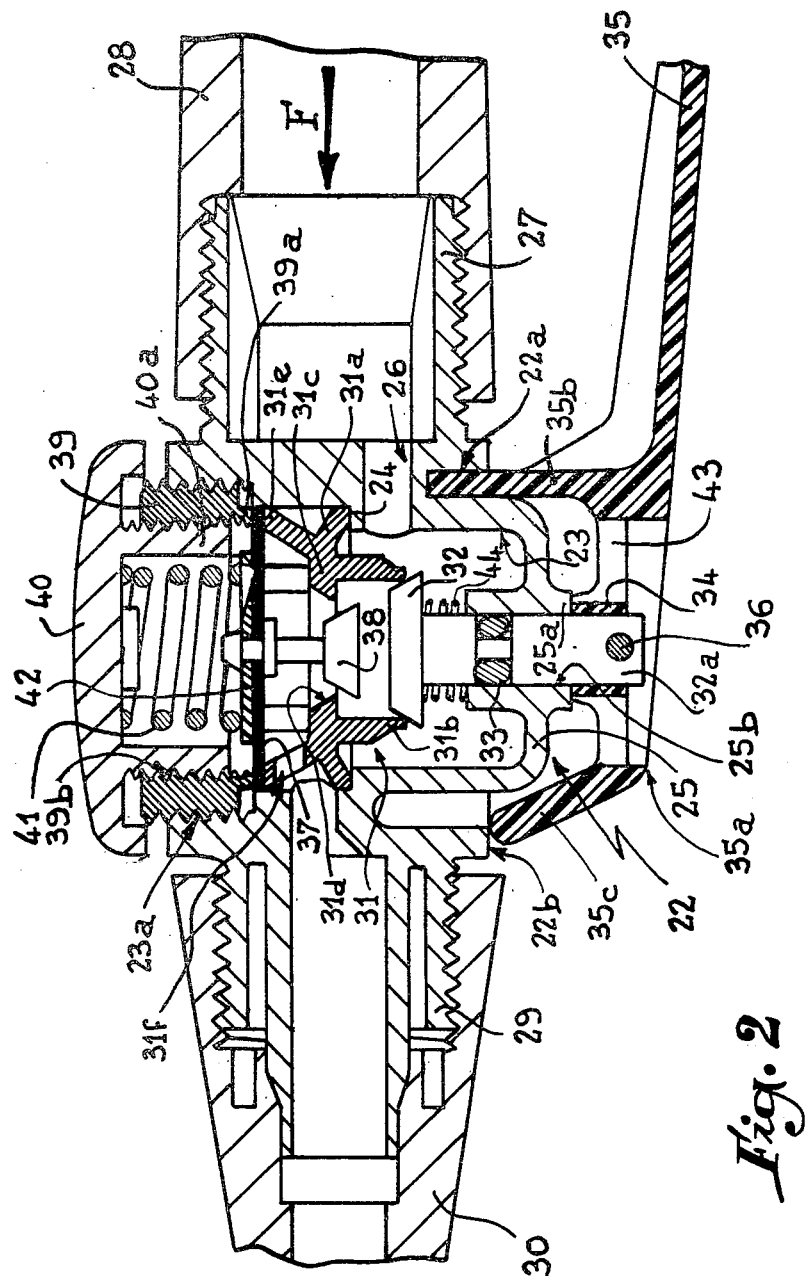
FIG. 2 is a view similar to FIG. 1, but which illustrates a preferred embodiment.

In the preferred embodiment of FIGS. 2 and 3, the valve body, here referenced 22, is made of an appropriate synthetic material such as a polyamid known under reference 6.6. It is formed with an upwardly opening central bore 23 which has three successive sections of increasing diameter. The lowermost or first section defines with the next or second one a shoulder 24, while the uppermost or third section is screw-threaded as indicated at 23a. The lower end of 23 is closed by a transverse partition 25 which may be considered as the bottom of body 22. Partition 25 has a central boss 25a with an axial perforation 25b.

The inner space of body 22 (i,e bore 23) is connected by a canal 26 with a lateral inlet 27 which is externally screw-threaded to receive a hose coupling such as 28. On the opposed side of body 22 there is provided an outlet 29 which communicates with bore 23 and which is also screw-threaded to receive a spraying nozzle 30. Bore 23 is divided into two superposed chambers by an intermediate tubular member 31 having an outer downwardly flaring skirt 31a the edge of which rests on shoulder 24. This intermediate member is preferably made either of polypropylene or alternatively of the polyamid known under reference 11. The lower end 31d of its main sleeve like portion forms a first valve seat 31b and it comprises above the said portion a transverse partition 31c having a central perforation 31d which forms a second valve seat. The first valve seat 31b cooperates with a first valve member 32 the stem 32a of which passes slidably through perforation 25b, fluid-tightness being ensured by an O-ring 33. The downwardly protruding end of stem 32a is received in a hub-like central portion 34 of the head 35a of an external actuating lever 35 and it is anchored thereto by a transverse pin 36. This lever 35 is formed with an upwardly projecting lug 35b the free end of which is mounted as a force fit in a lower slot 22a of body 22. Lever 35 further comprises a transversely extending nose 35c which bears against a flat portion 22b of body 22. It is made of a resilient synthetic material, such as polypropylene, in order that lug 35b may act as a resilient attaching blade, or in other words as a resilient pivot.

The intermediate member 31 further comprises an upwardly flaring collar-shaped portion 31e situated above partition 31c and the periphery of which is in contact with the cylindrical wall of the intermediate or second section of bore 23. This collar-shaped portion 31e has at least one perforation 31f, preferably aligned with outlet 29. The upper end of the said portion or collar 31e forms an annular supporting surface for the edge of a diaphragm 37 to the center of which is attached the stem of a second frusto-conical valve member 38 adapted to cooperate with the seat 31d of the transverse partition 31c of intermediate member 31.

The screw-threaded uppermost or third section 23a of bore 23 receives an annular screw 39 the lower end of which has a downwardly directed annular projection 39a which clamps the edge of diaphragm 37 against the upper edge of the upper collar-shaped portion 31e of intermediate member 31. This annular screw 39 is further internally screw-threaded to receive the screw-threaded tubular stem 40a of a hand-wheel or rotating button 40. The latter acts on an axial compression spring 41 the lower end of which takes rest on a washer 42 which is retained against the upper side of diaphragm 37 by the revetted upper end of the stem of the second valve member 38.

Returning to the first valve member 32, it should be noted that the hub-like portion 34 in which its stem 32a is engaged with a quite small clearance, or even somewhat as a force fit, is only connected with the remainder of lever 35 by relatively deformable arms 43, whereby the said portion may follow a quite rectilinear path when lever 35 is oscillated through a limited angle. A spring 44 disposed around the said stem 32a between the upper end of boss 25a and the head of valve member 32 tends to return the latter to the closed position against seat 31b.

The space situated above diaphragm 37 communicates with the outer atmosphere through the clearance between the inner screw-threads of screw 39 and the outer ones, of stem 40a. The upper wall of button 40 could also have a perforation (not illustrated) for that purpose.

When the parts are at the position of FIG. 2, i.e. lever 35 being unactuated, valve member 32 is closed by spring 44 and the liquid under pressure cannot flow from inlet 27 to outlet 29. Nose 35c engages portion 22b of body 22, but owing to the resiliency of arms 43, this does not prevent spring 44 from maintaining valve member 32 at the closed position against seat 31b.

If now lever 35 is depressed upwardly as indicated by arrow F2 in FIG. 3, it oscillates about lug 35b and it thus tends to pull downwardly its hub-like portion 34 together with the stem 32a of the first valve member 32. The resilient deformability of arms 43 being limited, valve member 32 is thus brought to the open position illustrated in FIG. 3, whereby the liquid may flow through the valve unit as indicated by the arrows, to reach the spraying nozzle 30.

But as soon as the pressure builds up within the latter, it acts on diaphragm 37 to raise it against the action of spring 41 to close second valve member 38. As in the case of FIG. 1, an equilibrium is reached for which the spraying nozzle receives liquid under a substantially constant pressure which may be adjusted at will by rotation of button 40.

Here again the invention provided a valve unit which permits an operator to control with the same hand the passage of the liquid towards the spraying nozzle, and the spraying pressure itself.

Furthermore, it has to be understood that the foregoing description has only been given by way of example and that it does not in any way limit the scope of the invention, from which there would be no departure if the constructional details as described are replaced by any other equivalents.

What I claim is:

1. A combination valve unit comprising:
   (a) a body having an inlet and an outlet, the body having a bore having a first portion communicating with said inlet and having a partition extending thereacross, and the bore having a second intermediate portion joined to the first bore portion at a shoulder, and the bore having a third portion opening into the atmosphere;
   (b) a tubular member mounted in the intermediate bore portion against the shoulder and having an annular edge facing toward the third bore portion, the tubular member having a first valve seat located toward the body partition from said annular edge and having a second valve seat located toward said body partition from said first valve seat, and the tubular member having an opening located between the first valve seat and the annular edge and communicating with the body outlet;

(c) first valve means comprising a diaphragm and including means securing said diaphragm against said annular edge and separating the second and third bore portions, a first valve member supported by said diaphragm adjacent to said first valve seat and operative to restrict fluid flow through said seat when the diaphragm flexes toward said third bore portion under fluid pressure in said tubular member, a cap mounted in threaded relation to said third bore portion and axially adjustable therein, and spring means compressed between said cap and said diaphragm;

(d) second valve means comprising a stem extending through said partition and having a second valve member shaped to close said second seat, and spring means operative between said partition and said second valve member for normally closing said second seat; and (e) actuating means supported outside the body and coupled with said stem and operative when actuated to displace the stem and second valve member away from the second valve seat.

2. The valve unit as claimed in claim 1, wherein said third bore portion has screw threads on its side walls, and wherein said means securing said diaphragm includes a threaded annular clamping means carried by said screw threads and clamping the diaphragm against said annular edge of the tubular member.

3. The valve unit as claimed in claim 2, wherein said annular clamping member is internally threaded, and said cap is supported therein and axially adjustable in the third bore portion.

4. The valve unit as claimed in claim 1, said actuating means comprising a lever having a flexible lug attached to said body to provide a pivotal support for the lever, said lever having a resilient deformable head having a hub shaped to receive said stem, and means for securing the stem to said hub.

5. The valve unit as claimed in claim 4, wherein said actuating lever is made of a flexible synthetic material, and said deformable head including an annular portion surrounding said hub and connected therewith by multiple deformable arms.

6. The valve unit as claimed in claim 5, wherein said actuating lever further includes a nose member extending toward said body from the head of the lever and abutting the body when the second valve member is seated.

* * * * *